United States Patent [19]
Kim

[11] Patent Number: 5,930,335
[45] Date of Patent: Jul. 27, 1999

[54] METHOD AND APPARATUS FOR TAPPING CONTROL IN AN ELECTRONIC SWITCHING SYSTEM

[75] Inventor: Young-Eul Kim, Incheon, Rep. of Korea

[73] Assignee: Daewoo Telecom, Ltd., Incheon, Rep. of Korea

[21] Appl. No.: 08/915,634

[22] Filed: Aug. 21, 1997

[30] Foreign Application Priority Data

Sep. 25, 1996 [KR] Rep. of Korea ...................... 96-42624

[51] Int. Cl.⁶ ..................................................... H04M 1/24
[52] U.S. Cl. ................................ 379/35; 379/7; 379/133; 379/265
[58] Field of Search .................................. 379/7, 35, 112, 379/113, 133, 134, 27–29, 201, 265, 266, 309, 308

[56] References Cited

U.S. PATENT DOCUMENTS

| | | |
|---|---|---|
| 4,503,290 | 3/1985 | Post et al. . |
| 4,937,862 | 6/1990 | Kosich . |
| 5,438,570 | 8/1995 | Karras et al. . |
| 5,535,256 | 7/1996 | Maloney et al. . |
| 5,818,909 | 10/1998 | VanBerkum . |
| 5,844,982 | 12/1998 | Knitl . |

*Primary Examiner*—Curtis A. Kuntz
*Assistant Examiner*—Duc Nguyen
*Attorney, Agent, or Firm*—Pennie & Edmonds LLP

[57] ABSTRACT

A method for use in an electronic switching system having more than one operator position system connected thereto, is used for wiretapping in order to determine a time length of a telephone call between a caller and a receiver. The method comprises the steps of: (a) measuring an elapsed time from the instant the caller is connected to the receiver; (b) checking if the elapsed time reaches a preset time; (c) wiretapping when the elapsed time reaches the preset time; (d) resetting the elapsed time and going back to step (a) if the caller is determined to be still on the line by the wiretapping; and (e) releasing the connection between the caller and the receiver if the caller is determined not to be on the line any longer by the wiretapping.

3 Claims, 4 Drawing Sheets

METHOD AND APPARATUS FOR TAPPING CONTROL IN AN ELECTRONIC SWITCHING SYSTEM

FIELD OF THE INVENTION

The present invention relates to an electronic switching system; and, more particularly, to a tapping control system for controlling the wiretapping of a subscriber's talk on a telephone line.

BACKGROUND OF THE INVENTION

Under certain circumstances, a telephone operating company may provide telephone services for an RD(ringdown) subscriber, wherein the RD subscriber is a subscriber having an RD telephone set. The RD telephone set is an obsolete-type telephone set, being neither a dial nor a push-button type of telephone, and for an RD subscriber to make a call to another subscriber, he just off-hooks a hand set or revolves a knob attached to the RD telephone. In response to the off-hooking or the revolving of the knob, an ESS (electronic switching system) which links itself to the RD telephone set informs the incoming of a signal to an OPS (operator position system) which is connected to the ESS, the ESS being located in a CO (central office), wherein the CO is an office of a telephone operating company where the ESS, transmission system, etc. are deployed to provide various telephone services. The OPS is an equipment for providing a variety of telephone services as well as establishing a call connection in response to a call request of the RD subscriber to interface with the ESS.

An operator at the OPS talks on the line with a calling RD subscriber, or the caller, to get the information on the call, e.g., the telephone number to be called, and the like. Then, the operator establishes a call connection between the caller and another subscriber the caller wants to be connected to by using the telephone number given by the caller.

In addition to the establishing of a call connection between subscribers, there are other functions that the OPS performs. One of such functions is related to a tariff.

An automated tariff system automatically performs tariffing services. By using the automated tariff system, a lapse time, i.e., the duration between a connection establishment and a connection release between the caller and the receiver, and the classification of a caller, e.g., a restriction to a subscriber and a grade of a subscriber, are automatically determined by using the information pre-stored therein.

On the other hand, a tariff on the RD subscriber may be performed by a semi-automatic method, wherein the lapse time is decided and manually inputted to the ESS by an operator at the OPS for the purpose of the tariffing services.

In order to decide the lapse time, the operator at the OPS needs to wiretap from the beginning of an on-the-line talk through the end or monitor periodically to check if the current caller is still in off-hook state. Such wiretapping imposes a great burden on the operator; and also is costly.

Although periodic monitoring is regarded more efficient, no equipment designed to periodically monitor an on-the-line talk has been developed yet.

SUMMARY OF THE INVENTION

It is, therefore, a primary object of the present invention to provide a method for determining a lapse time of a ringdown subscriber by controlling the wiretapping of a ringdown subscriber's on-the-line talk periodically in an electronic switching system.

In accordance with the present invention, there is provided a method, for use in an electronic switching system having more than one operator position system connected thereto, for wiretapping in order to determine the time length of a telephone call when a caller telephones a receiver, the method comprising the steps of: (a) measuring an elapsed time from the instant the caller is connected to the receiver; (b) checking if the elapsed time measured at step (a) reaches a preset time of a predetermined time duration; (c) wiretapping when the preset time is reached; (d) resetting the elapsed time and going back to step (a) if the caller is determined to be still on the line by the wiretapping at said step (c); and (e) releasing the connection between the caller and the receiver if the caller is determined not to be on the line any longer by the wiretapping carried out at said step (c).

BRIEF DESCRIPTION OF THE DRAWINGS

The above and other objects and features of the present invention will become apparent from the following description of preferred embodiments given with reference to the accompanying drawings, in which.

DETAILED DESCRIPTION OF THE PREFERRED EMBODIMENTS

Figure 1:
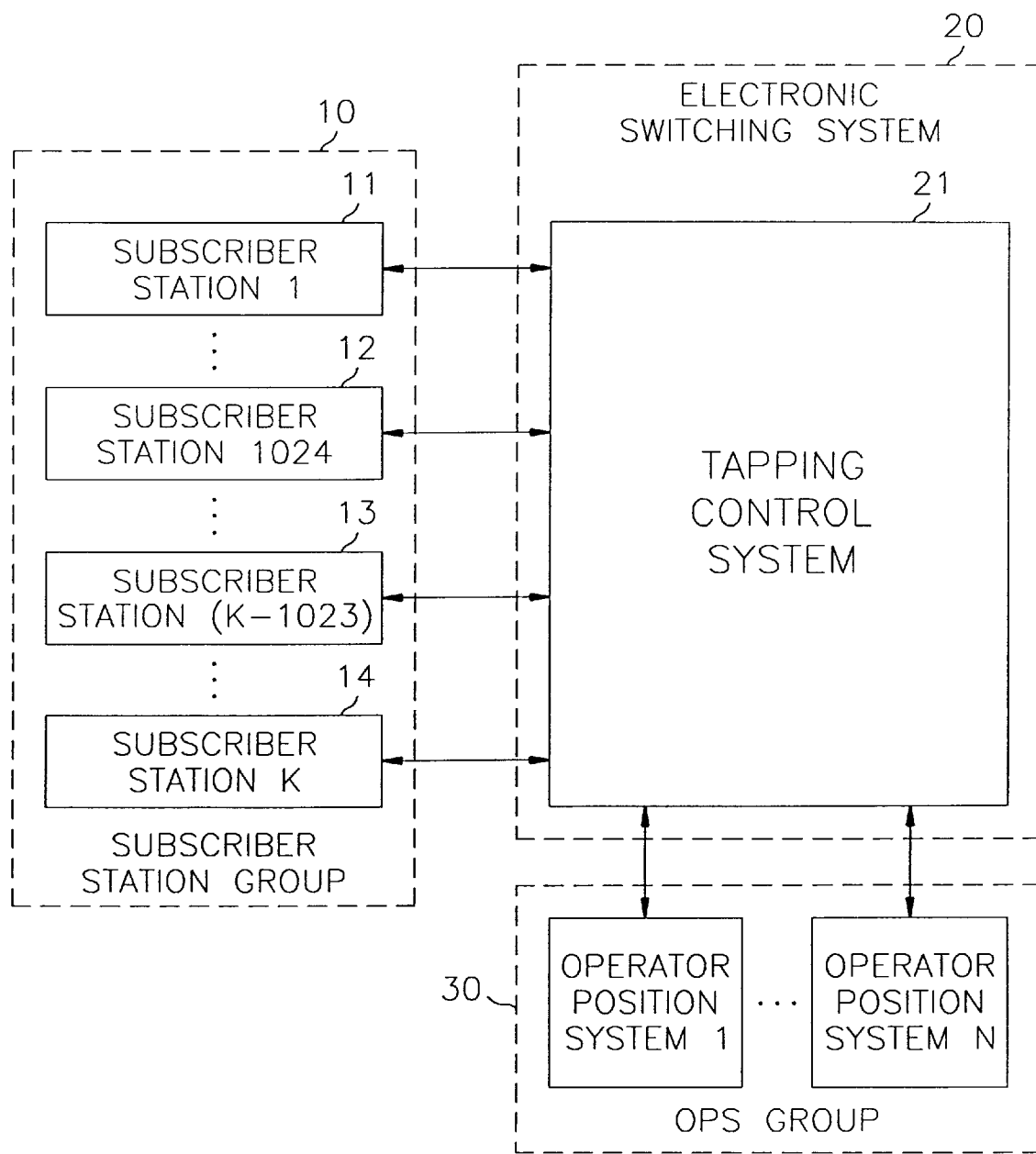
FIG. 1 illustrates a schematic diagram of a connection between subscribers and operator position systems through a tapping control system in accordance with the present invention.

Referring to FIG. 1, there is illustrated a schematic diagram of a connection between a subscriber station group 10 and an operator position system group(OPS group) 30 through a tapping control system 21 in accordance with the present invention. In FIG. 1, a subscriber station i of the subscriber station group 10 refers to an i-th RD subscriber station, i ranging from 1 to K, and can be connected to the tapping control system 21, K being a positive integer depending on the capacity of the tapping control system.

The tapping control system 21 is employed in an ESS (electronic switching system) 20 which resides in a CO(central office)(not shown). One of the main functions of the tapping control system 21 is controlling processes, e.g., establishing a call connection between a calling RD subscriber, a caller and another subscriber, a receiver, by interacting with the OPS group 30.

The OPS group 30 is a computerized system linked to the ESS 20. Each OPS of the OPS group 30 is embodied by a personal computer in the present embodiment of the present invention, which comprises a handset, a keypad, a display unit and data processing unit, each being not shown specifically in FIG. 1. The handset is for interactively talking on the line with the caller and receiver. The keypad is for inputting data to the data processing unit. The display unit is for showing various status and data to an operator at the OPS. The processing unit performs functions such as processing data in order to interact with the tapping control system 21, and controlling the handset, keypad and display unit.

A typical twisted-pair cable connects each subscriber station of the subscriber's station 10 to the ESS 20, while a communication line governed by the protocol according to the ITU-T recommendations Q. 921 and Q. 931 is employed to connect the tapping control system 21 to each of the OPS in the OPS group 30.

Figure 2:
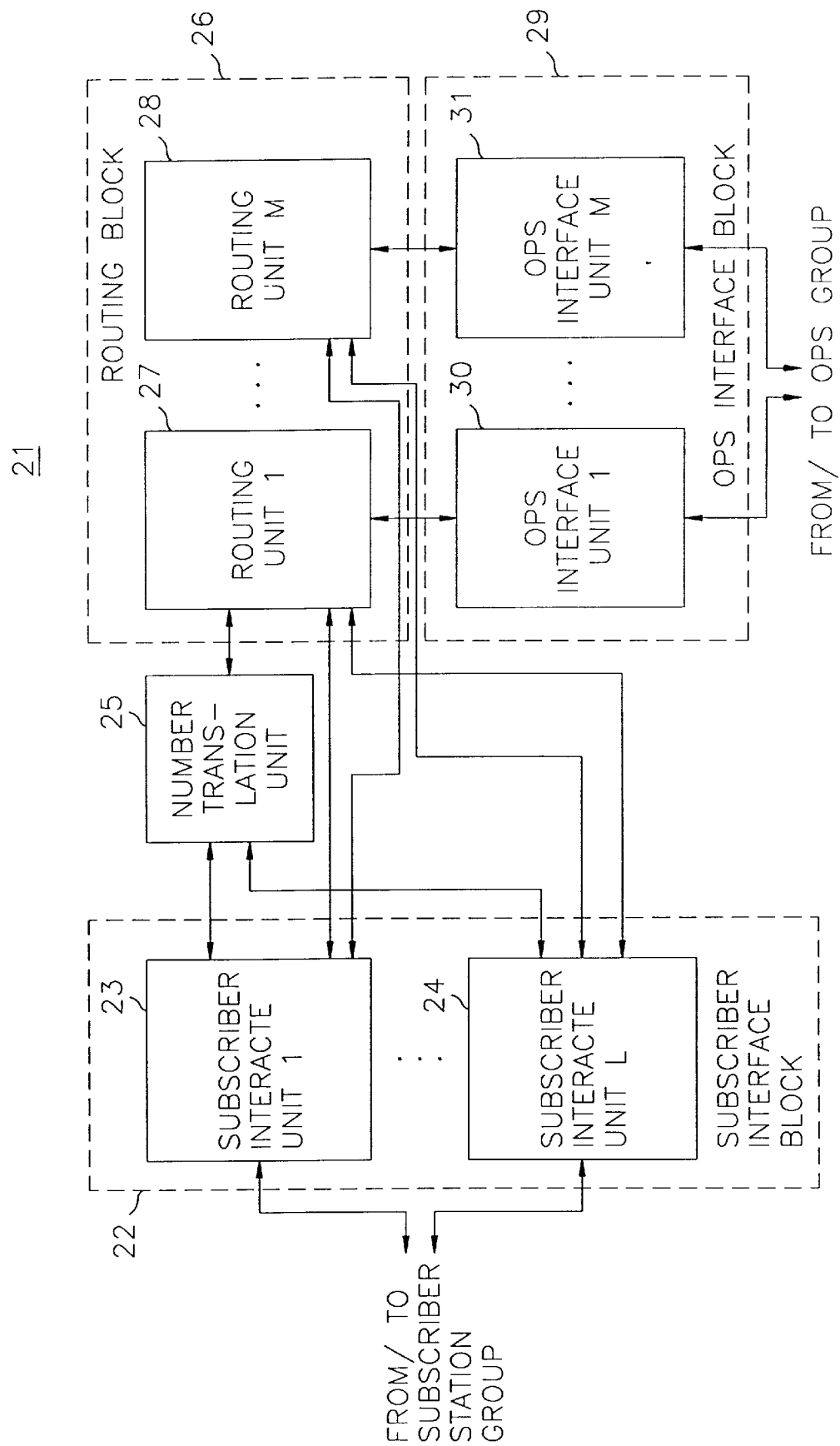
FIG. 2 describes details of the tapping control system shown in FIG. 1 along with the connection between the subscribers and the operator position systems through the tapping control system.

Referring to FIG. 2, there is illustrated a more detailed configuration of the tapping control system 21 shown in FIG. 1. The tapping control system 21 comprises a subscriber interface block 22 including L number of subscriber interface units, a number translation unit 25, a routing block 26 including M number of routing units and an OPS interface block 29 icluding M number of OPS interface units, wherein M is a positive integer ranging up to 128 in the preferred embodiment in accordance with the present invention.

The subscriber interface block 22 includes L number of subscriber interface units 23 and 24, wherein L is a positive integer spanning to a maximum of 22 in the preferred embodiment of the present invention. Each of the subscriber interface units 23 and 24 is capable of accommodating 1024 number of subscriber stations, therefore, K, the number of the subscriber stations 10 expands to a maximum of 1024× 22=22528 number of subscriber stations 11 to 14.

Each subscriber interface unit in the subscriber interface block 22 is connected to each routing unit 27 and 28 of the routing block 26 through the number translation unit 25. Each routing unit of the routing block 26 is also connected to one of the OPS interface units in the OPS interface block 29. Each OPS interface unit may be connected to one or more OPS's. In other words, one, two or more, or even no OPS may be connected to each OPS interface unit in the OPS interface block 29. The OPS group 30 consists of N number of the OPS's, wherein N is a positive integer depending on the make-up of the design based on the necessity and being limited by the number of the OPS interface units.

Each of the subscriber interface units in the subscriber interface block 22 requests the number translation unit 25 to seek an available OPS in response to a subscriber's off-hooking or rotating a knob, and informs the subscriber on the service availability for the call connection on the basis of the notice from the routing units of the routing block 26. In addition, the subscriber interface unit measures the lapse time, and requests a wiretapping at the OPS group 30 when a preset time duration $T_p$ is elapsed, wherein the preset time duration $T_p$ is a duration of time predetermined by a supervisor of the tapping control system 21 or an operator at an OPS.

The number translation unit 25, in response to the request for the call connection and the wiretapping from the subscriber interface unit of the subscriber interface block 22, requests to seek an available OPS to the routing unit of the routing block 26.

Each routing unit in the routing block 26 is to establish a call connection between the subscriber and the currently available OPS. Upon receiving the request to seek an available OPS from the number translation unit 25, each routing unit to which one or more OPS's are connected via an OPS interface unit checks in turn if any available OPS exists among the OPS's connected thereto. If an available OPS is found, the routing unit connected to the available OPS informs on the availability to the subscriber interface unit which has requested to seek an available OPS.

The OPS interface unit of the OPS interface block 29 transfers the request for the call connection from the routing unit of the routing block 26 to the OPS, and also transfers a response signal from the OPS to the routing unit of the routing block 26. Those interface functions described above is governed by the protocol of the ITU-T recommendations Q. 921 and Q. 931. The reason for employing the ITU-T recommendations Q. 921 and Q. 931 for a rather simple interface between the routing block 26 and the OPS group 30 is that they can support a variety of functions to the OPS's without being limited to the scope of the present invention, e.g., a reservation call, a call transfer, a call ticketing, and the like.

Figure 3A:
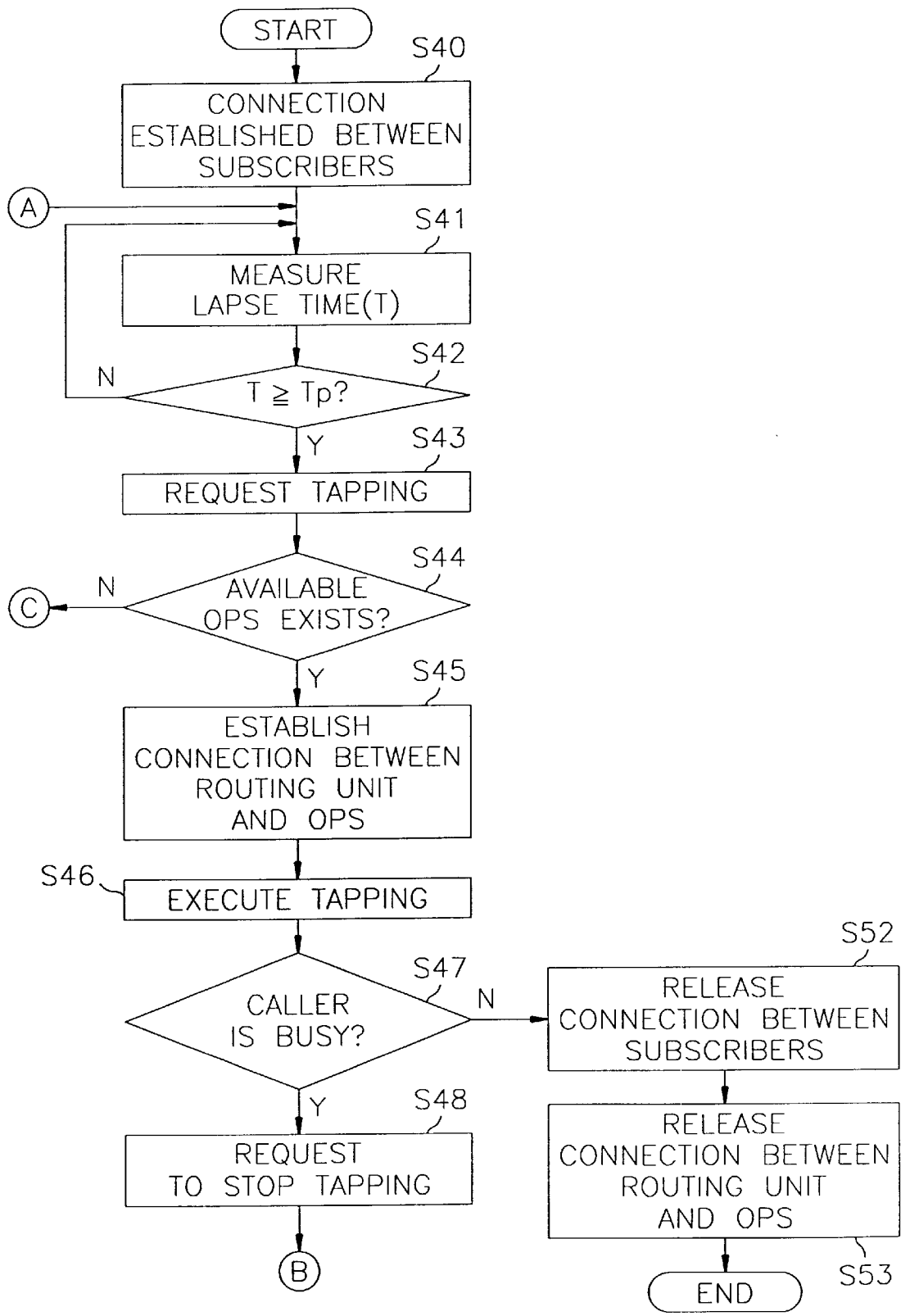
FIG. 3 shows a flowchart of a tapping control procedure in accordance with the present invention.
Figure 3B:
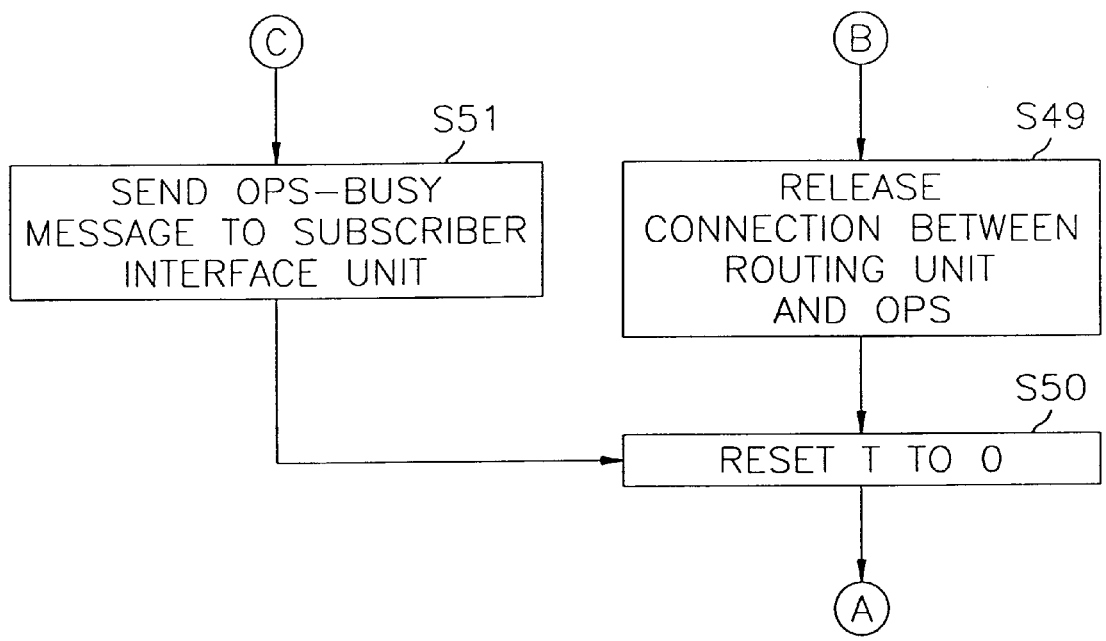

Hereinafter, the operation of the tapping control system 21 after a call connection being established between an RD subscriber, a caller, and another subscriber, a receiver, will be described in conference with FIG. 2 in parallel with FIGS. 3A and 3B.

Once the call connection is established between the caller and the receiver at step S40, the subscriber interface unit 1 23, supposing that the caller is an RD subscriber who is connected to the subscriber interface unit 1 for the purpose of illustration, the subscriber interface unit 1 23 measures the lapse time T at step S41. Herein the caller is one of the RD subscribers connected to the tapping control system 21 while the receiver has to be neither an RD describer nor a subscriber connected to the ESS 20 to which the caller is connected.

At step S42, it is checked if the lapse time T has reached to an amount equal to the preset time $T_p$. The preset time $T_p$ is designed to be adjustable, ranging from 1 minute to 10 minutes. The preset time $T_p$ is, however, preset to be 3 minutes in the preferred embodiment in accordance with the present invention.

If the lapse time T is determined to be less than the preset time $T_p$ at step S42, the subscriber interface unit 1 23 continues to measure the lapse time T after the procedure being returned to step S41; otherwise, the subscriber interface unit 1 23 requests wiretapping at an OPS to the number translation unit 25 at step S43.

The number translation unit 25 requests each routing unit to which more than one OPS's are connected to check, at step S44, if there exists any available OPS, wherein the "available" means the OPS is turned-on and not-busy, and hence is ready to provide a service.

If there is no available OPS's, each routing unit which has been requested for the search for an available OPS from the number translation unit 25 sends an OPS-busy message which corresponds to "all-the-OPS's-hereunder-is-busy" to the subscriber interface unit 1 23 at step S51. Upon receiving the busy message, the subscriber interface unit 1 23 resets the lapse time T to zero at step S50 and continues to measure the lapse time T after the procedure being returned to step S41.

If there is found an available OPS at step S44, the available OPS is selected to be ready for wiretapping. Subsequently, a call connection is established, at step S45, between the selected OPS and the routing unit that has the selected OPS thereunder. It should be noted that the selected OPS is other than the OPS which is currently serving the on-going talk between the caller and the receiver.

Then, the operator at the selected OPS wiretaps the on-going talk between the caller and the receiver at step S46.

At step S47, it is determined as to whether the caller is busy on the line.

If the caller is detected to be busy, the operator at the selected OPS stops wiretapping and requests the subscriber interface unit 1 23 to discharge the call connection between the selected OPS and the routing unit that has the selected OPS thereunder. Subsequently at step S49, the subscriber interface unit 1 23 releases the call connection between the selected OPS and the routing unit that has the selected OPS thereunder. Then, the procedure goes back to step S50 where the lapse time T is reset to zero.

At step S47, if it is determined that the talk between the caller and the receiver has been over, the subscriber interface unit 1 23 releases the call connection between the caller and the receiver at step S52. Then, the procedure proceeds to step S53 where the connection established between the routing unit that has the selected OPS thereunder and the selected OPS is released and the whole wiretapping procedure ends.

On the basis of the lapse time determined at the procedure as described above, the telephone operating company issues a phone bill to the caller.

While the present invention has been described with respect to the preferred embodiments, other modifications and variations may be made without departing from the scope and spirit of the present invention as set forth in the following claims.

What is claimed is:

1. A method, for use in an electronic switching system having more than one operator position system connected thereto, for wiretapping in order to determine the time length of a telephone call when a caller telephones a receiver, the method comprising the steps of:

(a) measuring an elapsed time from the instant the caller is connected to the receiver;

(b) checking if the elapsed time measured at step (a) reaches a preset time of a predetermined time duration;

(c) wiretapping when the preset time is reached;

(d) resetting the elapsed time and going back to step (a) if the caller is determined to be still on the line by the wiretapping at said step (c); and (e) releasing the connection between the caller and the receiver if the caller is determined not to be on the line any longer by the wiretapping carried out at said step (c).

2. The method of claim 1, wherein said step (c) includes the steps of:

(c1) requesting the wiretapping;

(c2) checking if there exists an available operator position system;

(c3) wiretapping if the available operator position system exists; and (c4) resetting the elapsed time and going back to said step (a) if there exists no available OPS.

3. An apparatus, for use in an electronic switching system having more than one operator position system connected thereto, for wiretapping in order to determine the time length of a telephone call when a caller telephones a receiver, the apparatus comprising:

L number of subscriber interface means connected to a plurality of RD subscribers, a number translation means and routing means for requesting the number translation means to seek an available operator position system, requesting a wiretapping when an elapsed time since a connection between the caller and the receiver is established reaches a preset time, measuring the elapsed time of a predetermined time duration;

a number translation means for transferring the request for seeking the available operator position system from the subscriber interface means to a routing means;

M number of routing means for establishing a call connection between the subscriber and the available operator position system, for connecting the RD subscriber to the available operator position system in response to a call establishment request from the number translation means; and M number of interfacing means for executing a communication protocol between the routing means and the available operator position system according to a ITU-T recommendations Q. 921 and Q. 931, wherein L and M are positive integers.

* * * * *